United States Patent [19]
Chua et al.

[11] Patent Number: 5,519,526
[45] Date of Patent: May 21, 1996

[54] OPTICAL PROTOCOLS FOR COMMUNICATION NETWORKS

[75] Inventors: Peter L. Chua, Pasadena; James L. Lambert, Sunland; John M. Morookian, La Habra; Larry A. Bergman, Van Nuys, all of Calif.

[73] Assignee: California Institute of Technology, Pasadena, Calif.

[21] Appl. No.: 964,641

[22] Filed: Oct. 21, 1992

[51] Int. Cl.$^6$ ................................................. H04B 10/00
[52] U.S. Cl. ...................... 359/152; 359/153; 359/118; 359/161
[58] Field of Search ........................ 359/114, 118, 359/127, 136, 161, 152–153, 341; 370/18; 372/6

[56] References Cited

U.S. PATENT DOCUMENTS

| | | |
|---|---|---|
| 4,703,474 | 10/1987 | Foschini et al. ...................... 359/114 |
| 5,321,707 | 6/1994 | Huber ............................................ 372/6 |

Primary Examiner—Leo Boudreau
Assistant Examiner—K. Negash
Attorney, Agent, or Firm—Michael L. Keller; Michaelson & Wallace

[57] ABSTRACT

The invention is a fiber-optic communication network, including a fiber-optic coupler having multiple fiber-optic ports and multiple optical transceivers which are individually connected to one of the fiber-optic pods. Each optical transceivers includes apparatus for transmitting to and receiving from the fiber-optic coupler, optical pulse signals in accordance with a predetermined code sequence of the transceiver, and optical amplifiers for amplifying the optical pulse signals. Each optical transceivers also includes apparatus for spectrally phase encoding/decoding, in accordance with the predetermined code sequence, optical pulse signals being transmitted to and received from its associated fiber-optic port, and apparatus for reconfiguring the code sequence in accordance with a user select signal. Each optical transceivers further includes detection apparatus for detecting a received optical pulse signal transmitted from another of the optical transceivers. The detector apparatus includes apparatus for magnifying the amplitude of the received optical pulse signal. Additionally, each of the optical transceivers includes apparatus for selecting an optical carrier center frequency at which the optical transceiver receives and transmits optical pulse signals within a predetermined frequency band in accordance with a user center frequency select signal. The different carrier center frequencies are selectable from a set of non-overlapping carrier frequency bands. This allows communications on the network between different user pairs at different carrier center frequencies.

14 Claims, 5 Drawing Sheets

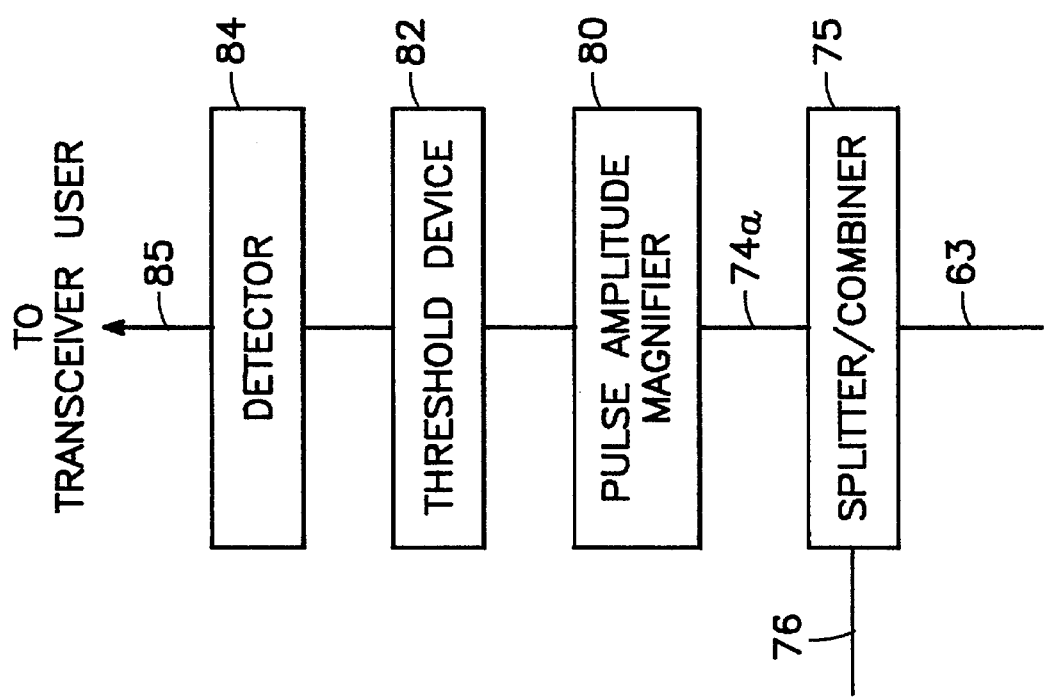

OPTICAL PROTOCOLS FOR COMMUNICATION NETWORKS

BACKGROUND OF THE INVENTION

1. Origin of the Invention

The invention described herein was made in the course of performance of work under a NASA contract, and is subject to the provisions of Public Law 96-517 (35 USC 202) in which the Contractor has elected to retain title.

2. Technical Field

This invention relates to an all photonic fiber-optic local area network (LAN) utilizing a protocol system based on spectral phase Code-Division Multiple-Access (CDMA) techniques.

BACKGROUND ART

Present day fiber-optic local area networks (LANs) are limited in speed by two well-known mechanisms: the switching times of optoelectronic devices that interface to the media, and the processing delay associated with LAN multi-access or multiplexing protocols currently implemented in electronics. To overcome these limitations and fully exploit the available bandwidth in single mode optical fibers (i.e.>10 THz), the photon-electron-photon conversion bottleneck must be avoided, and methods of implementing LAN protocols in the optical domain must be found. A new class of fiber-optic multi-access networks based on optical Code-Division Multiplexing (CDM) or Code-Division Multi-Access (CDMA) has recently been introduced to meet these challenges. In these networks, optics is used to replace or augment electronics in the high-speed signal processing and/or multiplexing techniques for multi-access and other low-level functions at the physical and network layers. LAN protocols can therefore be implemented all-optically in these networks and the electronics need only to operate at the bit-rate of the individual user.

In the optical CDMA scheme, multiplexing is achieved by transmitting optical signals encoded with minimally-interfering code sequences, (e.g. orthogonal, pseudonoise or PN codes) which are then uniquely decoded at the receiver, despite interference from simultaneous transmissions of the other channels. This process of encoding, which results in taking-up more bandwidth (i.e. a spread-spectrum technique), can be done in any one of five possible domains: space, time, amplitude, frequency or phase. The mapping of a low-bandwidth to high bandwidth signal due to the encoding process makes this method inherently secure and resistant against jamming and interference. Also, no centralized coordination or synchronization among the various users is required and, thus, asynchronous multi-access with no waiting time is possible. This asynchronous multi-access feature also allows easily adding new users to the network.

A number of optical CDMA techniques encoding over various domains have either been proposed or demonstrated for fiber-optic LANs. An early proposal employed a multiplexing scheme in the time-domain where a two-step (i.e. electronic and optical) encoding and decoding process is involved. Optical fiber tapped delay lines were proposed for the encoding and decoding of optical signals. Later a device loosely based on this proposal was demonstrated. In this demonstration, optical encoding using optical fiber tapped delay lines was simulated by directly modulating a diode laser with a coded electronic signal. A code-matched optical fiber tapped delay line at the receiver end was then used to correlate and decode the original signal from the network. A 100 Mbit/sec fiber-optic link with three users was demonstrated in this experiment.

Another CDMA scheme was later proposed where the optical signal is phase encoded using electro-optic phase modulators. Dubbed Random Carrier or RC-CDMA, the aim was to achieve the widest possible spread in the spectrum of the coded optical signal so that the carriers of all the users are scattered and allowed to wander randomly over the broad bandwidth of the fiber-optic medium. This was partly in answer to the poor frequency stability and phase noise characteristics of present semiconductor lasers which might be used in such systems. This proposed scheme was subsequently demonstrated. The spectrum of the carrier signal was spread and despread via direct bi-phase modulation/demodulation of the optical signal in time (a cw beam for this case) using $LiNbO_3$ electro-optic phase modulators. A common PN code sequence generator was shared by both encoding and decoding modulators, which were then properly synchronized using a delay line. Throughput of the order of hundreds of Mbits/sec was measured for this system.

There are disadvantages in the optical CDMA schemes discussed above. Any scheme that involves electronic encoding or decoding of data bits does not really remove from the system the speed-limiting electronics. Also, the use of optical fiber tapped delay lines as optical encoders/decoders does not leave room for dynamic code reconfigurability of any kind. Finally, in the RC-CDMA based system, a call start-up procedure or synchronization between the transmitter and receiver is required.

Next came the optical CDMA concept proposed by Salehi et al. in "Fundamental principles of fiber-optic code-division multiple access (OF-CDMA)", Proc. IEEE Int. Symp. Inform. Theory, Catalog 87 CH 2424-0, 1987, pp. 1601–1609, and "Coherent ultrashort light pulse code-division multiple access communication systems", IEEE J. Lightwave Tech., vol. LT-8, pp 478–491, Mar. 1990. The concept involves spectral phase encoding of individual optical pulses. In this scheme, each pulse is decomposed into its spectral components using a dispersive optical arrangement (e.g. using prisms, diffraction gratings). Coding is then introduced to the optical pulse in the form of phase-shifts between the spectral components via a binary coded optical phase-plate placed at the Fourier plane. After encoding, a symmetric dispersing arrangement then reassembles the spread-out beam back to a single coded pulse before it is transmitted to the network. At the receiving end, the same process is implemented, except that a conjugate phase-plate is used to selectively decode the pulse from the background. Using PN code sequences, any improperly decoded pulse remains a low intensity noise burst that is rejected by an intensity threshold detector. This form of CDMA is aptly termed spectral phase CDMA. In a demonstration loosely based on the above scheme, successful encoding and decoding of 75 femtosecond optical pulses at 0.62 um wavelength was accomplished.

However, the concept was demonstrated only in free space and no fiber transmission of any kind was involved. No one to date has been able to solve the difficulties encountered in implementing an all optical spectral phase CDMA in a fiber-optic connected system. Numerous problems must be resolved to do so. First, due to the power losses inherent in employing optical fiber and the associated fiber-optic components such as couplings, modulators, etc., the so-called light budget becomes unmanageable. So much power is lost that the pulse can literally be too "weak" at the receiving end to be detectable. The wavelength range (i.e. 1300–1600 nm) at which a communication-type fiber-optic system operates efficiently, also presents difficulties. In this wavelength range, the data pulses have to be extremely short (i.e. subpicosecond duration)in order to possess sufficient spectral bandwidth to enable encoding and decoding with reasonably sized optics. The spectral components that make up the pulse must be discrete enough so that once diffracted, the resulting physical separation is sufficiently wide as to allow encoding/decoding of only individual ones of them without affect on adjacent components. Additionally, the pulse rate must be consistent with that of modern high-speed communication systems (i.e. MHz-GHz). And, finally, the phase dispersion effects that naturally occur during transmission of an optical pulse through optical fiber must be reversed to maintain the integrity of the phase encoding. Generation of an optical pulse with all these attributes has not heretofore been achieved for use in an all optical communications network.

Once the difficulties encountered with implementing the spectral phase CDMA in fiber-optics have been overcome, a new set of practical concerns arises. The system must have certain features to make its use as a LAN feasible. As there will no doubt be a significant number of users in the network, the problem of interference arises. The demonstration of the Salehi concept mentioned above, proved a 25:1 reduction in the peak intensity of an improperly decoded data pulse was possible. But, what if there are more than 25 users on the network at any one time. The optical power in the improperly decoded pulses is additive. This means a properly decoded data pulse could eventually be overshadowed by the cumulative effect of improperly decoded pulses at a receiver as the number of users increases. Additionally, the encoder/decoder mechanism will have to be reconfigurable to make the system workable. A transmitting user must have the capability to encode the outgoing data as desired. Similarly, a receiving user must be able to select the conjugate coding of the receiver's encoder/decoder mechanism so as to determine what data is to be received. The implications of this reconfigurability feature are enormous. Boolean functions could be optically implemented and the system could take advantage of optical processing techniques for networking applications. A host of networking protocols at various levels such as addressing, routing, error detection, arbitration, network controls etc. could thus be implemented dynamically. Up till now, no spectral phase CDMA system has had this capability to change the coding. It is also conceivable that a user would wish to communicate with different networks with the same transceiver. To accomplish this task, the transceiver would have to be switchable so that a user could select the particular network that communication is desired with, while at the same time excluding incoming and outgoing data from all other networks accessible by the transceiver.

It is the object of this invention is to overcome the difficulties listed above concerning implementation of the spectral phase CDMA in a fiber-optic medium and incorporation of the features necessary to make its use for network communications practical.

Specifically it is the object of this invention to incorporate a series of fiber-optic amplifiers to resolve the problem of power loss so as to present a pulse of sufficient power to the receiver that it is detectable.

It is a further object of this invention to generate a data pulse for encoding and decoding that has a duration of less than one picosecond, consists of a sufficient number of discrete spectral component with a center frequency within the require wavelength range, at a pulse rate exceeding 1 GHz, and exhibiting a no spectral phase dispersion.

It is a still further object of this invention to provide a means of enhancing the amplitude of a properly decoded pulse to such an extent that even the existence of numerous improperly decoded data pulses at the receiver's detector will not overshadow its intensity.

It is another object of this invention to incorporate a means whereby the coding of the encoder/decoder section of a transceiver is reconfigurable.

And it is still another object of this invention to provide a means whereby the user can select one of a plurality of networks accessible by the user, with which communication is desired, exclusive of the rest.

SUMMARY OF THE INVENTION

The invention is a fiber-optic communication network, including a fiber-optic coupler having multiple fiber-optic ports and multiple optical transceivers which are individually connected to one of the fiber-optic ports. Each optical transceivers includes apparatus for transmitting to and receiving from the fiber-optic coupler, optical pulse signals in accordance with a predetermined code sequence of the transceiver, and optical amplifiers for amplifying the optical pulse signals. Each optical transceivers also includes apparatus for spectrally phase encoding/decoding, in accordance with the predetermined code sequence, optical pulse signals being transmitted to and received from its associated fiber-optic port, and apparatus for reconfiguring the code sequence in accordance with a user select signal. Each optical transceivers further includes detection apparatus for detecting a received optical pulse signal transmitted from another of the optical transceivers. The detector apparatus includes apparatus for magnifying the amplitude of the received optical pulse signal. Additionally, each of the optical transceivers includes apparatus for selecting an optical carrier center frequency at which the optical transceiver receives and transmits optical pulse signals within a predetermined frequency band in accordance with a user center frequency select signal. The different carrier center frequencies are selectable from a set of non-overlapping carrier frequency bands. This allows communications on the network between different user pairs at different carrier center frequencies.

In one embodiment of the invention, each of the optical amplifier apparatus includes a fiber-optic amplifier characterized by a fiber optic gain frequency band. Each of the optical transceivers in this embodiment includes an optical pulse carrier source apparatus for producing a train of optical pulses characterized by a pulse width on the order of not substantially more than one picosecond, a discrete optical spectrum, and a carrier frequency within the fiber optic gain frequency band. It should be noted that each of the optical pulses in this train of optical pulses consists of one of the optical pulse signals mentioned above. Each transceiver further includes data modulator apparatus for gating individual pulses of the train of optical pulses in accordance with an incoming stream of binary data characterized by a data rate, wherein the train of optical pulses is characterized by a repetition rate at least equal to the data rate.

Each of the optical transceivers is controllable by a corresponding remote user node and contains apparatus for feeding back optical pulses transmitted by the transceiver to the corresponding user node for confirmation thereof. Each of the optical transceivers further includes apparatus for compensating for ordinary spectral phase dispersion of the optical pulse signals in the network.

Preferably, the optical pulse carrier source further includes apparatus for compressing a pulse width of each one of the optical pulses. The apparatus for compressing includes a length of optical fiber in the carrier source. The optical pulses initially generated by the carrier source have a sufficiently shod pulse width and sufficiently high pulse amplitude so as to induce local disturbances in the index of refraction of the length of optical fiber, whereby a negative spectral phase dispersion of the optical pulses is produced. This compensates for ordinary spectral phase dispersion of the optical pulses in the carrier source in addition to compressing the pulse width of each of the optical pulses.

Additionally, the optical carrier source includes a laser which is actively mode-locked by an optical modulator. The modulator is driven by a pulse generator having a pulse repetition rate which governs the repetition rate of the train of the optical pulses generated by the carrier source. Each transceiver has an apparatus for coupling the laser modulator driver pulse generator to the aforementioned data modulator. This apparatus causes the data modulator to be synchronized with the optical pulses generated by the carrier source. The laser also includes a fiber-optic ring laser cavity with a doped optical fiber gain section. The aforementioned optical pulse repetition rate corresponds to a higher harmonic of this laser cavity.

The previously mentioned apparatus for spectrally phase encoding/decoding also includes an apparatus for reducing a peak amplitude of each of the optical pulse signals by a factor which is a function of the number of transceivers in the network, "N", whereby to enable distinction between a superposition of N-1 optical pulse signals received from other transceivers whose code sequences are not conjugates of the code sequence of the receiving transceiver.

The aforementioned apparatus for spectrally phase encoding/decoding further includes an apparatus for spatially dispersing spectral components of the optical pulse signal in a spectral order in a Fourier plane and a reconfigurable phase modulator apparatus located at the Fourier plane for phase-delaying selected ones of the spectral components in accordance with the previously discussed code sequence. This phase modulator apparatus has a spatial resolution, wherein the optical pulse signal which has a discrete optical spectrum and sufficiently narrow pulse width, permits the apparatus for spatially dispersing to disperse the spectral components to a spatial resolution between the spectral components corresponding to the spatial resolution of the phase modulator apparatus.

The phase modulator apparatus includes one of: (a) an electronically reconfigurable spatial light modulator and (b) a mechanically shiftable phase plate, and includes apparatus for phase delaying a predetermined fraction of the spectral components of the optical pulse signal in a spatial sequence corresponding to the code sequence.

The aforementioned apparatus for magnifying the amplitude of a received optical pulse signal includes one of: (a) a frequency doubler, (b) a saturable absorber, (c) a fiber optic loop mirror.

Industry standard modular self-aligning fiber-optic connectors connect each of the optical amplifiers between corresponding ports of the fiber-optic coupler and corresponding ones of the optical transceivers, and provides the connections between components of the network, thereby greatly facilitating construction.

The invention described above constitutes a fiber-based all optical spectral phase CDMA LAN protocol system providing a vast improvement over current electronic based or electro-optic based LAN systems. The aggregate throughput speeds can be increased by 100X, the system has non-blocking crossbar functionality thereby permitting access by many users simultaneously with no waiting time, has no need for centralized coordination, and can be implemented asynchronously if desired. The end result is an advanced, multi-service LAN capable of supporting real-time data services for various applications. For terrestrial applications, for example, this could provide the communications fabric for high rate, real-time services such as: high definition television (HDTV), real-time, high-resolution digital 24-bit color videographics operating in the 750 Mbits/sec range, multiple Fiber Distributed Data Interfaces or FDDI (125 Mbits/sec), hypercube or MAX backplane connections (128X200 Mbits/sec), and synthetic aperture radar (SAR) processing (300–1000 Mbits/sec), all transmitted simultaneously without the need for currently required multiplexers, common clock recovery, or arbitration. For aerospace applications, for example, this could provide the communication fabric for the Data Management System (DMS) of Space Station Freedom, and other high-bandwidth requirements of earth-orbiting satellites and deep space probes for telemetry, SAR imaging and processing, etc. These systems would especially benefit from this invention's high throughput, and robustness (i.e. immunity to RF interference, ground loop isolation) and reduced size, weight and power consumption of the system. Indeed this networking technology could provide the basic communications fabric aboard spacecrafts to make "telescience" (i.e. the on-craft preprocessing of data during acquisition to reduce downlink telemetry bandwidth requirements) a reality. This is especially important for deep-space interplanetary missions where the large speed disparity between instrument data acquisition rates and downlink rates will mandate massive on-board storage and computational facilities.

BRIEF DESCRIPTION OF THE DRAWINGS

Further details are explained below with the help of the examples illustrated in the attached drawings in which:

FIG. 5 shows the configuration of the detection apparatus of an optical transceiver as depicted in FIG. 1.

DETAILED DESCRIPTION OF THE INVENTION

Figure 1:
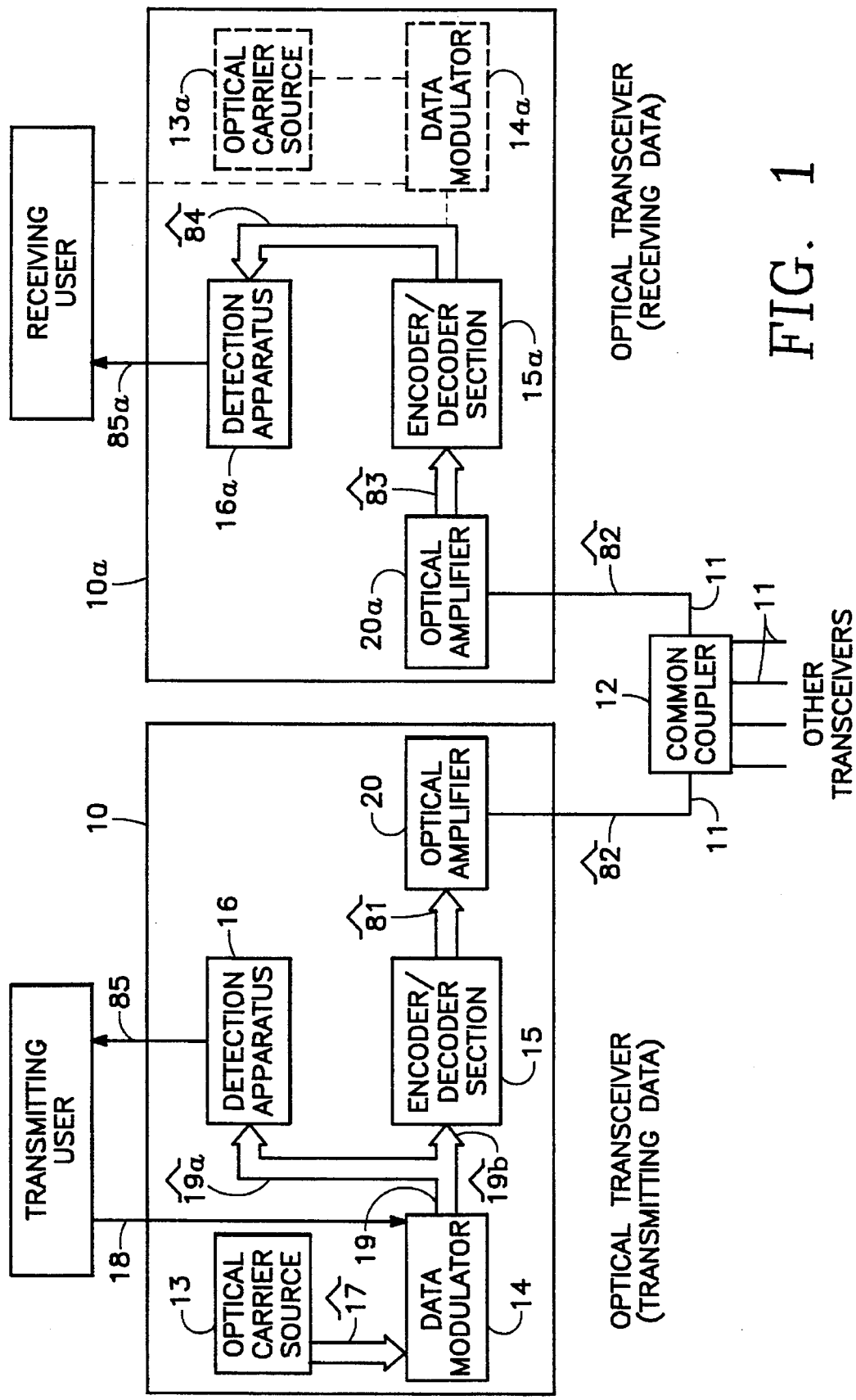
FIG. 1 is an overall view of all photonic fiber-optic local area network (LAN) according to the present invention where the configuration and operation of an optical transceiver in transmitting mode and an identical transceiver in receiving mode is highlighted.

Referring to FIG. 1, the overall invention of an optical protocol system for high speed communication networks includes a plurality of identical optical transceiver units 10, 10a, where each is connected via optical fibers 11 through a common optical coupler 12 to each of the other transceivers 10, 10a in the network. Each optical transceiver 10, 10a consists of an optical carrier source 13, 13a, data modulator 14, 14a, encoder/decoder section 15, 15a, an optical amplifier 20, 20a, and detection apparatus 16, 16a. During data transmission from an optical transceiver 10, the optical carrier source 13 provides a pulse train 17. The optical carrier source pulse train 17 is then modulated by the data modulator 14 to impress user data 18 onto the carrier pulse train 17. The resulting data pulse train 19 is then split, with one copy 19a being directed to the transceiver's detection apparatus 16 to provide the user with a feedback of the transmitted data via signal path 85. The second copy 19b is encoded in the encoder/decoder section 15. Encoding entails diffracting each optical pulse in the data pulse train 19b into its spectral components and phase delaying some chosen number of these components, preferably one-half, in a distinctive binary pattern. The encoded spectral components are then recombined into a mixed state 81 for amplification by the optical amplifier 20 and transmission to the network via the common network coupler 12. The transmitted encoded data pulse train 82 is received from the network by another transceiver 10a, amplified by the receiving transceiver's optical amplifier 20a, and directed into that receiving transceiver's encoder/decoder section 15a. The received and amplifier pulse train 83 is decoded by the receiving transceiver's encoder/decoder section, and the resulting decoded pulse train 84 is then transferred to the transceiver's detection apparatus 16a for output to the user via a signal path 85a.

Decoding involves diffracting each encoded data pulse into its spectral components and phase delaying the aforementioned chosen number of components in a distinctive binary pattern. If the receiving transceiver's encoder/decoder section 15a exhibits the conjugate coding pattern to the transmitting transceiver's encoder/decoder section 15, then the spectral components will be properly decoded by bringing all the components back into phase with each other. Otherwise, the encoded pulse will be improperly decoded because some of the spectral components will be out of phase with the others. In the preferred embodiment, a coding sequence is chosen which ensures an encoded data pulse which is decoded with an encoder/decoder section 15a, that is not the conjugate of the transmitting unit's encoder/decoder section 15, will result in one-half of the spectral components being out of phase with the others. The tested embodiment utilizes a well known binary coding referred to as maximal length sequences (or M-sequences). If one-half of the spectral components of an optical pulse are encoded (i.e. selectively phase shifted) with this type of sequence, and decoding is attempted with a non-conjugate decoder, the result is a different combination of components that are out of phase with the other components but the number of such components still equals one-half.

The fact that an improperly decoded data pulse would have one-half of its spectral components out of phase with the rest in the tested embodiment, whereas a properly decoded data pulse's spectral components would all be in phase, has significance in regards to the operation of the detection apparatus 16, 16a of the transceiver 10, 10a. During encoding, the intensity of the original data pulse is diminished because the power contributions of each spectral component, which were additive when all the components were in phase, now compete with components of differing phases. In addition, the pulse spreads out temporally due to the phase delays. The result is a low intensity flattened pulse which resembles a noise burst. In the preferred embodiment where one-half of the spectral components are out of phase with the other half, this noise burst effect is most profound.

The aforementioned choice of M-sequence coding was based on a desire to maintain this maximization of the noise burst effect after improper decoding. This desire is satisfied because the resulting product of the decoding has the same quantity of phase discrepant spectral components as the encoded data pulse and so similar noise burst effect maximization. This has significance because the properly decoded data pulses are high intensity shod duration pulses clearly distinguishable from the low intensity "noise bursts" of improperly decoded data pulses.

The optical transceiver 10,10a of this invention also has the capability to communicate with more than one network and to switch between them. The center wavelength of the pulses 17 generated by the optical carrier source 13, 13a is adjustable so as to allow communications with different networks, where the various networks operate at different center wavelengths. Additionally, the encoder/decoder section 15, 15a contains means to select the center wavelength of pulses it will accept, and to block all others. Thereby, the transmitting user selects the center frequency of the data pulses to be transmitted, and so what communications network will be accessed. Similarly, the receiving user selects the center frequency of the data pulses to be received, and so what communications network will be heard from. Thus, in addition to accommodating multiple communications within a single optical network via the encoding/decoding process, this feature allows communication between multiple networks using the same optical transceiver 10, 10a.

Each of the five major sections of the optical transceiver 10,10a of this invention must be configured as to create, encode/decode, and detect the data pulses described above. The following paragraphs will describe the physical configuration and operation of each of these sections, i.e. the optical carrier source 13, 13a, the data modulator 14, 14a, the encoder/decoder section 15, 15a, the optical amplifier 20, 20a, and the detection apparatus 16, 16a. It should be noted that the tested embodiment is specifically described below, along with mention of some preferred embodiments of individual components of this invention. However, the ultimate embodiment of this invention is envisioned to be the integration of all components onto miniature monolithic optoelectronic integrated circuits.

The Optical Carrier Source

The first step in implementing the optical protocol system is to create the aforementioned carrier pulse train 17. This pulse train is generated by the optical carrier source 13. The optical carrier source 13 is essentially a specialized mode locked pulse laser. However, before the configuration of the carrier source 13 can be discussed, some basic operating parameters must be understood. Firstly, the transceivers 10,10a of this invention communicate via standard optical fiber lines 11. These fibers operate efficiently when the source light wavelength is between about 1300 nm and 1550 nm. However, due to optical power losses inherent in a fiber-optic system and some power decreasing measures that are necessary to obtain the high intensity, short duration pulses required in this invention (as will be discussed below), it becomes necessary to increase the power of the data pulses 17 so that they can ultimately be detectable by the detection apparatus 16, 16a. This problem is solved by the addition of erbium-doped fiber-optic amplifiers 20, 20a in the system. The significance of this addition to the operating parameters of the optical carrier source 13 is that this type of amplifier operates best in a wavelength range of 1500–1600 nm. Therefore, the optical carrier source in this invention must produce pulses with a center wavelengths in that range.

In addition, the pulse widths must be extremely short in order to increase the spectral bandwidth of the pulse. This requirement is driven by the desire to use reasonably sized optics in the encoder/decoder section 15, 15a of the transceiver 10, 10a. When the bandwidth is broadened by shortening the pulse width, the spectral components spread out when diffracted. This wider physical separation allows the use of a shorter focal length, thereby allowing the use of smaller optical gratings and lenses in the encoder/decoder section 15, 15a. Therefore, by minimizing the pulse width, the encoder/decoder optics can be made smaller. The tested optical carrier source in this invention produces pulses with widths of 0.8 picosecond in duration. This is about the longest pulse rate acceptable, as the size of the optics gets burdensome if the pulse width is any longer. The optimal embodiment of this invention would produce carrier pulses on the order of 0.1 picosecond so as to allow implementation of the optics on an miniature monolithic optoelectronic integrated circuit, as mentioned above.

The final operating parameter to be discussed is the pulse rate. Obviously, the pulse rate should be as high as the user requires in the particular task the optical protocol is being used to accomplish. However, an all optical protocol system is capable of extremely high data rates limited only by the maximum pulse rate of the optical carrier source 13 and the speed of the detecting apparatus 16, 16a used to recognize the optical data pulses. As noted in the background section of this disclosure some current communication systems operate at data rates as high as 1 GBits/sec. The tested embodiment of this invention was set to operate at a pulse rate of 50 Mbits/sec. However, preferred embodiments would operate at pulse rates of 1 GBits/sec and faster.

Figure 2:
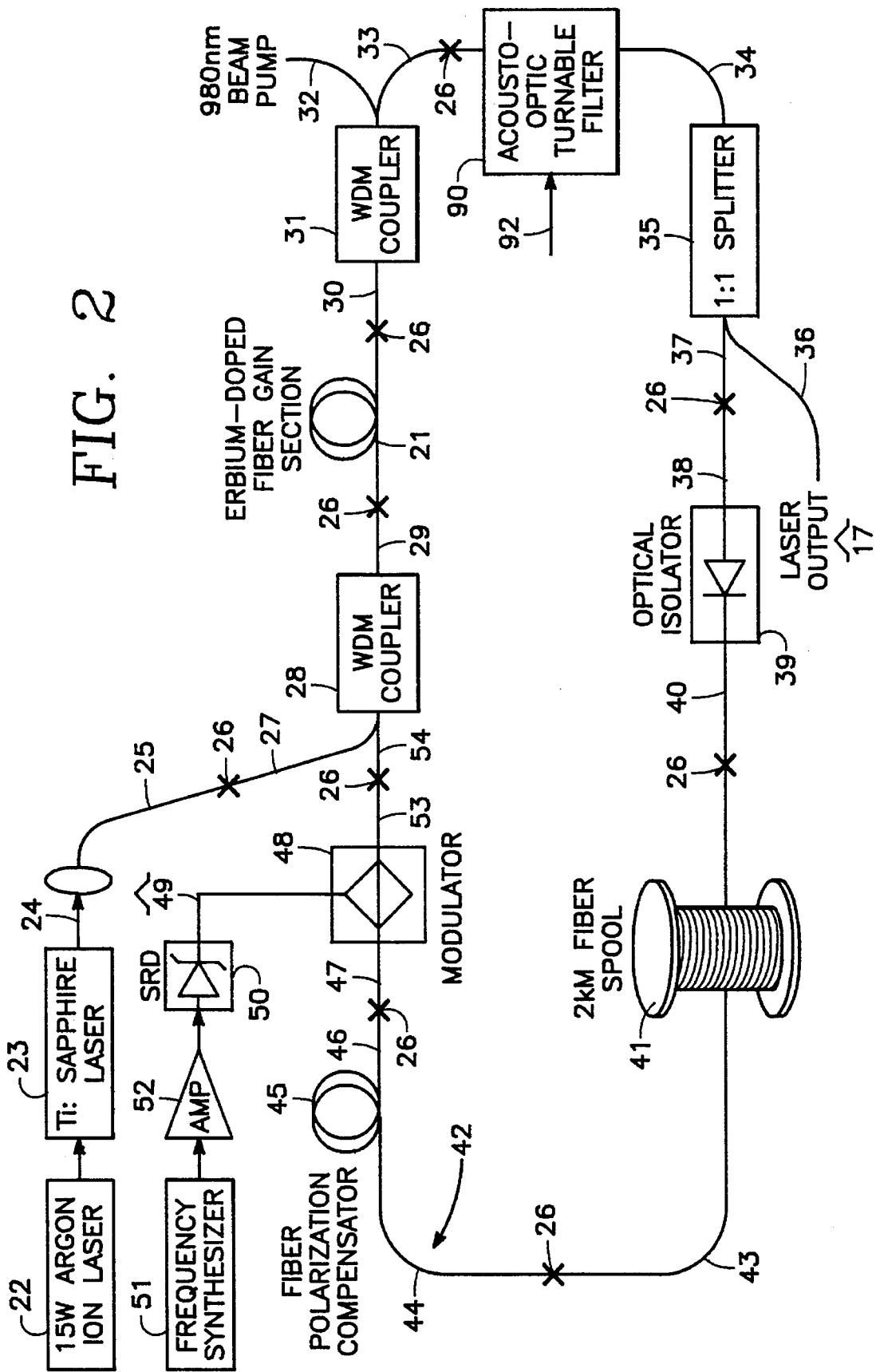
FIG. 2 shows the configuration of the optical carrier source component of an optical transceiver as depicted in FIG. 1.

With these basic operating parameters in mind and referring to FIG. 2, the following is the configuration of the tested embodiment of the optical carrier source 13 which will produced a pulse train with the required attributes. As stated, the optical carrier source 13 is basically a pulse laser specially customized to produce the type of pulse train described above. In the tested embodiment, an erbium-doped fiber ring laser system 13 with active fiber based mode-locking capability was chosen. This type of laser has advantages in the implementation of this invention. First, it is a optical fiber laser, meaning all the component connections within and without the laser can be made with standard optical fiber connectors. This allows for ease in alignment of the various components of the laser, enables the use of a pigtailed ring geometry, and flexibility wherein a mode-locking modulator is placed within the loop which makes construction of the device easier. The almost insurmountable alignment problems of prior art free space lasers used in protocol systems is completely eliminated by the use of this type of laser. In addition, the erbium-doped gain section 21 of this laser, lases at 1550 nm, thereby providing a center wavelength in the required range.

This optical carrier source laser 13 was constructed by using a 15 W Argon ion laser 22 to pump a Ti:sapphire laser 23. This produces a 200 mW continuous wave output 24 at a wavelength of 980 nm. This output is coupled to a length of standard telecommunications single-mode optical fiber 25 via conventional alignment optics of the type well known in the art. This fiber 25 is connected by typical fiber connecting means 26 to the 980 nm "input" fiber 27 of a 980 nm/1550 nm wavelength division multiplexing (WDM) coupler 28. The single "output" 29 of this coupler is connected to the gain section 21, comprising a 0.8 m long, 600–800 ppm erbium-doped optical fiber with a core diameter of 3.5 micrometers. The 200 mW of 980 nm wavelength radiation 24 from the Ti:sapphire laser 23 is used to pump the gain section 21 and initiates lasing at a wavelength of 1550 nm. The opposite end off the erbium-doped fiber 21 is connected to the single "input" fiber 30 of an identical 980 nm/1550 nm WDM coupler 31. The 980 nm "output" fiber 32 of this coupler is directed out of the ring laser 13 to "dump" the 980 nm radiation.

The 1550 "output" fiber 33 of the second coupler 31 is connected to a bi-directional acousto-optic tunable filter (AOTF) 90 with a tunable wavelength range of 1500–1600 nm. The AOTF 90 allows a transceiver user, by input of a center wavelength select signal 92, to adjust the center wavelength of the optical carrier pulses 17 generated by the optical carrier source 13, 13a, in the aforementioned wavelength range. The AOTF 90 enables the user to communicate with various separate networks operating at different center wavelengths. The adjustment is stepped so that each selected center wavelength is separated in the frequency domain by more than the spectral bandwidth of the carrier pulse 17. This ensures the various networks envisioned by this invention operate at completely separate frequencies, so as to not interfere with each other if common optical fiber communications lines 11, 12 are shared between the networks. It should be noted that the range of wavelength adjustment does not exceed the efficient operating ranges of the wavelength sensitive devices used in this invention, i.e. the optical amplifiers 20, 20a and the WDM couplers 28, 31.

The output of the AOTF 90 is connected to the single "input" 34 of a 1:1 fused fiber splitter 35. The first "output" 36 of the splitter 35 is directed out of the ring laser 13. This fiber 36 carries the optical carrier pulse train 17 out of the source laser 13 for use by the transceiver's data modulator 14, 14a.

The second output 37 of the splitter 35 is connected to the throughput side 38 of an optical isolator 39 having a greater than 60 dB suppression in the reverse direction and 0.6 dB insertion loss. The isolator 39 is inserted to ensure a unidirectional pulse circulation within the ring laser 13 to prevent any unwanted modal interference.

The opposite side 40 of the optical isolator 39 is connected to a 2 km spool of standard telecommunications single-mode optical fiber 41 with an 18 ps/nm/km dispersion characteristic. This component 41 of the ring laser 13 has a dual purpose. The first purpose is to counteract the ordinary phase dispersion that naturally takes place between the spectral components of the pulse as it travels through the optical fiber of the ring laser 13. A "negative phase dispersion" phenomenon exists whereby a pulse possessing a high peak power locally changes the index of diffraction of an optical fiber as it propagates through the fiber, in a way that the phases of the spectral components of the pulse drift in the exact opposite manner as the ordinary phase dispersion. If the peak power is high enough and the fiber-optic spool 41 long enough, the ordinary phase dispersion effects of the optical fiber are completely compensated. The second purpose of the fiber spool 41 is to compress the pulse width. The same "negative phase dispersion" phenomenon described above also affects the pulse characteristics. The pulse width is shortened, and consequently the spectral bandwidth of the pulse increases. As described above, this is of particular advantage in this invention as it allows for downsizing of the optics in the transceiver's encoder/decoder section.

The opposite end 43 of the fiber spool 41 is connected to the input 44 of a fiber polarization compensator 45. This component 45 is well known in the art and is incorporated to counteract the natural tendency of the pulses to shift in polarization due to the ring geometry of the laser cavity (i.e. the ring 42).

The output 46 of the fiber polarization compensator 45 is connected to the input side 47 of a LiNbO₃ integrated optic Mach-Zehnder modulator 48 with a 3 GHz bandwidth, 30 bB contrast ratio, and 5 dB insertion loss. This component 48 is used to modulate the cavity (i.e. ring 42)loss for active mode-locking. Mode-locking the optical carrier source 13, 13a on a particular mode results in the creation of a pulse made up of discrete spectral components. This facilitates the construction of an encoder for phase encoding of the pulse, as will be discussed later, because the discrete spectral components can be diffracted resulting in a physical separation that allows phase-shifting any one component without affecting the adjacent components. Active mode-locking is employed over passive methods to allow the synchronization of the transceiver's data modulator 14 by tapping the modulator's 48 driver pulse signal 49, as also will be discussed later. The modulator 48 is driven by an appropriately biased step-recovery diode (SRD) 50 generating 12 V peak electrical pulses 49 with 120 picosecond pulse widths. The diode 50 is in turn driven by a conventional frequency synthesizer 51 and amplifier 52 combination. By mode-locking the ring laser, the modulator 48 determines the pulse rate of the system. The pulse rate of the particular SRD 50 dictates the pulse rate of the laser. However, for the laser 13 to operate properly, the choice of the a particular SRD 50 and so the pulse rate must be such that it is an integer multiple of the natural pulse rate of the laser cavity (i.e. ring 42). In the tested embodiment, the natural cavity pulse rate is 25 MHz and the chosen SRD pulse rate is 50 MHz. However, as stated, the ultimate embodiment of the invention would mode-lock at a pulse rate exceeding 1 GHz. In this context, it must be noted that a tradeoff occurs. In order to mode-lock at higher than the natural cavity pulse rate, the mode-locking must be on a higher frequency harmonic of the pulse than the center wavelength of 1550.

The higher harmonic will necessarily possess less energy than the center wavelength. This impacts the peak power of the pulse which then affects the ability to reverse the natural spectral dispersion, and to compress the pulse width, in the 2 km fiber spool 41. Two factors must be balanced to obtain a desired pulse rate and still maintain the spectral phase integrity and pulse compression afforded by the disclosed configuration of optical carrier source 13 of this invention. These factors are the length of the fiber in the spool 41 and the power input to the erbium-doped gain section 21. At lower peak pulse powers, the negative phase dispersion and pulse width compression effects may require a longer length of fiber to fully develop. However, if the fiber length is increased, the laser cavity is thereby increased, and so lowering the natural pulse rate of the cavity (i.e. the ring 42). Therefore, the modulator 48 would have to mode-lock on an even higher, lower power harmonic, thereby lowering the peak power more. This quandary is resolved by increasing the power of the pulse by increasing the power of the pump laser 23. The 50 MHz pulse rate at which the tested embodiment was mode-locked at, was found to produce the desired pulse characteristics using the specified 2 km spool of fiber 41 and the 200 mW pump laser 23.

The output of the modulator 53 is connected to the 1550 nm "input" fiber 54 of the first 980 nm/1550 nm WDM coupler 28. This connection closes the ring and completes the configuration of the tested embodiment of the optical carrier source 13 of this invention.

The erbium-doped fiber ring laser as embodied above was chosen as the preferred optical carrier source 13 because its optical fiber construction eases assembly and eliminates free space alignment problem, it produces subpicosecond pulses with sufficient bandwidth to allow for reasonably sized optics, is capable of pulse rates commensurate with the data rates of the fastest communication networks currently existing, and lases at 1550 nm which is within the required wavelength range. However, alternate 1550 nm wavelength optical sources could be substituted. A mode-locked color-center laser followed by a non-linear external resonator is one possibility. This type of laser is capable of producing pulse widths of 0.07 picosecond duration, but are bulky and require vacuum and cryogenic equipment. Another possibility is a monolithic colliding pulse actively mode-locked quantum well laser. This laser is capable of pulse rates around 30 GHz, although the pulse width exceeds 1 picosecond. An actively mode-locked erbium-doped fiber laser utilizing a 15 GHz Ti:LiNbO₃ electro-optic mode-locking modulator can produce pulse rate up to 30 GHz, but this laser also produces pulse widths exceeding 1 picosecond. These three alternate carrier sources are not meant to be all-inclusive, but exemplify some of the existing potential substitutes for the carrier source of this invention.

It should also be noted that the Argon ion pumped Ti:sapphire laser 23 used in turn to pump the erbium-doped fiber gain section 21 of the tested embodiment could be replaced advantageously with a small semiconductor diode laser with a power output equaling or exceeding that of the Ti:sapphire laser.

The Data Modulator

The second step in implementing the optical protocol system of this invention is to impress the user generated data 18 onto the optical carrier pulse train 17 created by the optical carrier source 13, 13a. The task is accomplished with the data modulator section 14, 14a of the optical transceiver 10, 10a.

Figure 3:
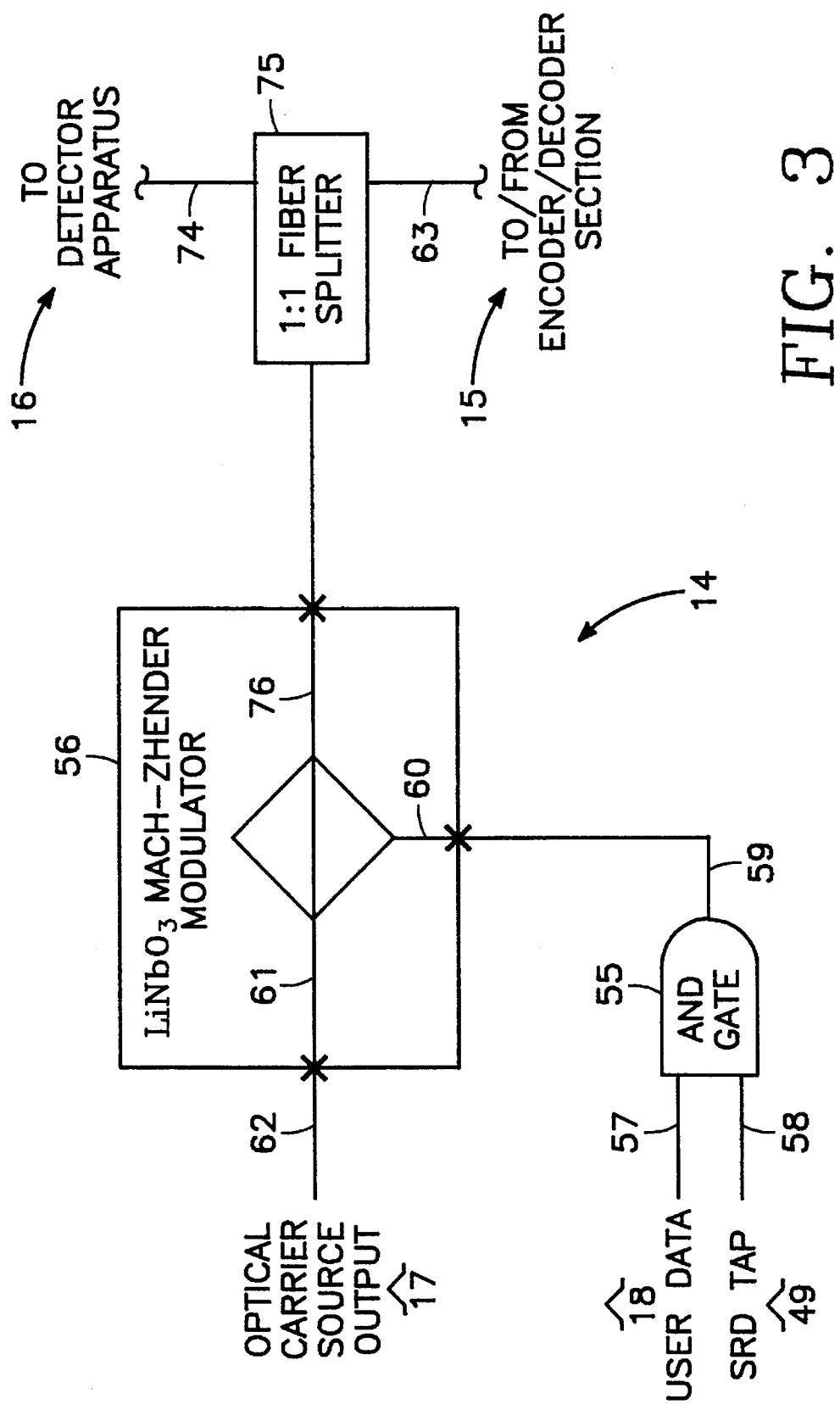
FIG. 3 shows the configuration of the data modulator component of an optical transceiver as depicted in FIG. 1.

Referring to FIG. 3 the configuration of the data modulator section 14, 14a can be seen to consist of an electronic AND gate 55 and an electro-optic modulator 56. Electrical pulses representing the system user's data 18 are fed into the first of two inputs 57 to the electronic AND gate 55. The second input 58 to the AND gate 55 is connected to the output of the step-recovery diode (SRD) 50 that is driving the electro-optic modulator 48 used to mode-lock the ring laser 13, 13a. The single output 59 of the AND gate 55 is connected to the electrical input 60 of a LiNbO₃ integrated optic Mach-Zehnder modulator 56 with a 3 GHz bandwidth, 30 bB contrast ratio, and 5 dB insertion loss. This is identical to the modulator 48 used to mode-lock the optical carrier ring laser 13, 13a. The optical input 61 to the data modulator 56 is connected via optical fiber 62 to the output of the optical carrier ring laser 13, 13a. The output 76 of the data modulator 56 is connected to an optical isolator in accordance with good engineering practices. The output of the isolator is connected via optical fiber to the first port of a fiber-optic T-coupler 75. The output 76 is split between the other two ports of a T-coupler 75. The second port of the T-coupler 75 is connected to the optical transceiver's encoder/decoder section 15, 15a by an optical fiber 63 as will be discussed later. The third port of the T-coupler 75 is connected to the detection apparatus 16, 16a of the transceiver 10, 10a, by an optical fiber 74, as will also be discussed later.

As stated previously, the pulse rate at which the SRD 50 generates electrical pulses 49 is equal to the pulse rate of the optical carrier pulse train 17. Additionally, the mode-locking modulator 48 of the ring laser 13, 13a synchronizes the optical pulses generated by the laser 17 to the electrical pulses generated by the SRD 49. Therefore, by tapping the output of the SRD 50 and feeding it into the second input 58 to the AND gate 55, the user data 18 is synchronized with the carrier pulse train 17. This occurs because the AND gate 55 will only output a signal to the data modulator 56 if a pulse from the SRD 50 has energized the second input 58 to the AND gate 55 and at the same time the first input 57 to the AND gate 55 is energized by a data pulse from the user. An optical carrier pulse will arrive at the data modulator 56 at the same time a pulse from the SRD 50 arrives at the second input 58 to the AND gate 55, due to the aforementioned synchronization. If a user data pulse arrives at the first input 57 of the AND gate 55 during the duration of the SRD pulse (i.e. while the second input 58 to the AND gate 55 is energized), the AND gate 55 outputs a signal to the data modulator 56. Similarly, if a user data pulse has already energized the first input 57 to the AND gate 55, when the SRD pulse arrives at the second input 58, the AND gate 55 outputs a signal to the data modulator 56. Therefore, the user data 18 is synchronized with the SRD output 49, and so with the optical carrier source output 17.

The above described data modulator 56 operates by blocking optical pulses unless the modulator 56 is energized via the electrical input 60. Therefore, if an optical pulse from the carrier pulse train 17 arrives at the modulator 56 at the same time the AND gate 55 outputs a signal, that optical pulse will be output from the modulator 56. If no energizing signal arrives from the AND gate 55, the optical pulse is blocked and nothing is output from the modulator 56. In this way the user's data pulses are impressed on the optical carrier signal 17. Once the user data is impressed on the optical carrier pulse train 17, it is ready to be encoded.

As this just described process implies, the data rate of the user data 18 must not exceed the optical pulse rate of the carrier pulse train 17, otherwise data would be lost. However, since the modulator 56 can only output when a user data pulse is received at the first input 57 to the AND gate 55, if the user data rate is slower than the optical carrier source pulse rate, the blocking process within the modulator 56 would block optical pulses until the data pulse is received. In this way the carrier pulse train 17 would adapt to the slower user data rate. Consequently, even though this system can not accurately operate at data rates above the carrier source pulse rate, it can operate at any user data rate below the pulse rate of the carrier source 13, 13a.

It should be noted that the tested embodiment converted and impressed electrical user data pulses 18 onto the optical carrier source pulses 17. However, this system could also be configured to impress optical user data pulses onto the carrier 17 by employing an optical version of the AND gate 55 whereby the user data 18 is connected to one input 57 and the carrier source pulse train 17 is connected to the other input 58. An optical pulse is then outputted whenever both the user pulse and the carrier pulse coincide at the inputs 57, 58.

The Encoder/Decoder Section

The next step in implementing the optical protocol system of this invention is to encode the optical data pulses 19b generated by the data modulator section 14 of the transmitting transceiver 10. This task is accomplished by the encoder/decoder section 15 of the transmitting transceiver.

Figure 4:
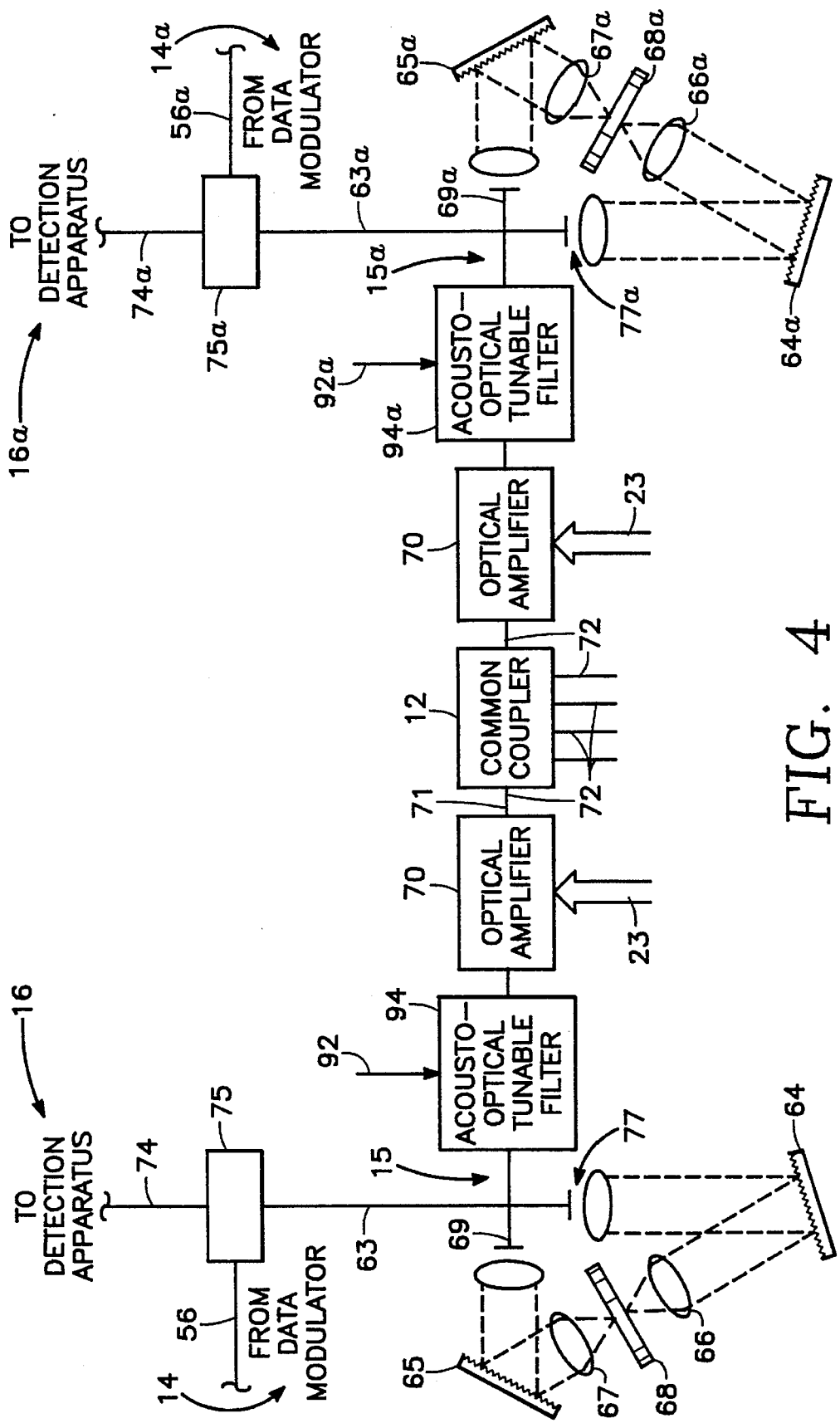
FIG. 4 shows the configuration and operation of the encoder/decoder section of the transmitting optical transceiver and the receiving optical transceiver as depicted in FIG. 1.

Referring to FIG. 4, the encoder/decoder section 15, 15a has first and second optical diffraction gratings 64, 64a, 65, 65a, first and second collimating lenses 66, 66a, 67, 67a, a spectral component phase encoder/decoder 68, 68a, and an acusto-optical tunable filter (AOTF) 94. In the transmitting transceiver, the first grating 64 is positioned so as to receive a light pulse from the second port 63 of the data modulator 14 via conventional alignment optics 77. The first grating 64 diffracts the optical data pulse into its spectral components. The first grating 64 is followed by a first collimating lens 66 placed one focal length from the grating 64, where the focal length is that of the lens 66. As will be seen, this is done to obtain the maximum linear separation of the spectral components with respect to one another after collimation and focusing. The collimating lens 66 changes the diverging angles of incidence of the spectral components so that each is parallel to the others. The now diffracted and collimated optical data pulse leaves the first collimating lens 66 and impinges on the surface of an encoder/decoder element 68. The encoder/decoder element 68 is positioned so as to be parallel to the face of the collimating lens 66 and at a distance of one focal length from the lens. This allows the various spectral components of the pulse to focus on the encoder/decoder element 68 with maximum linear separation from each other. The encoder/decoder element 68 causes a phase delay in selected ones of the spectral components of the data pulse.

The tested embodiment of the encoder/decoder element 68 was in the form of an optical phase plate. The phase plate was constructed of a 3 mm thick z-cut quartz substrate. A pattern consisting of side-by-side 8 mm x 100 um elements was employed. The elements in this pattern which were to correspond to spectral components of the data pulse that would be phase delayed, were etched into one of the surfaces of the substrate to a depth of 1.5 um. These specification of height, width and depth for the elements are known in the art. Essentially the height is redundant and need only be larger than the spectral component's beam spot size. The width is set so as to correspond to the separation of the spectral components of the optical data pulse. And the depth is set to induce a 180 degree phase shift.

The M-sequence coding scheme discussed previously was employed to create the etching pattern. It should be recalled that one-half of the spectral components making up the sequence were to be phase delayed. The coding pattern chosen was repeated by placing identical coding patterns end to end on the phase plate substrate. The reason for this derives from a unique feature of M-sequences whereby a cyclical shifting of the elements of a M-sequence code creates a different M-sequence. Therefore, in one aspect of the invention, mechanical shifting of the plate in the spectral window creates a new M-sequence coding of the spectral components because the original pattern was repeated across the face of the substrate. The shifting can be done by one of any number of such mechanical shifting means known to the art. This code changing capability allows the transmitting transceiver to communicate with multiple other transceivers by changing the encoding of the data pulses to the conjugate coding of one of the other transceivers in the network, thus permitting optical reconfiguration of network protocols. After transmission, the coding could be changed back to the original M-sequence for receiving communications from other transceivers whose encoder/decoder element is set at the conjugate of the original code.

This mechanical code changing encoder/decoder element is not the preferred method however. It is envisioned that the phase plate would be replaced with a spatial light modulator for network protocol reconfiguration. Such a device would allow the coding to be changed electronically while maintaining all the phase shifting capabilities of the phase plate. A few candidate technologies exist which could make this preference reality. TeO2 acousto-optic (AO) modulators, nematic liquid crystal (LC) phase modulators, and vanadium-doped CdTe photorefractive semiconductors are a few examples of phase modulator devices that operate in the wavelength range of this invention and could replace the phase plate used in the tested embodiment.

Once phase encoded, the spectral components of the data pulse leave the encoder/decoder element 68 and encounter the second collimating lens 67. This lens 67 is identical in size, shape and placement to the first 66, except that in this example, it acts as a de-collimator. The de-collimated spectral components return to their original angular trajectories once leaving the second lens 67.

The now "de-collimated" spectral components impinge upon the second optical grating 65. This grating 65 is identical to the first 64 in size, shape and placement except it is placed so as to, in essence re-diffract the spectral components exiting the second lens 67, thereby bringing all spectral components back together in the same beam of mixed components. This "mixed" phase-encoded data pulse is transferred to a standard communications fiber-optic line 69 via conventional alignment optics.

The fiber-optic line 69 is thereafter connected to the input of the AOTF 94, which is identical to the AOTF unit 90 used in the optical carrier source 13. However, the AOTF 94 serves no purpose in the case of a transmitting transceiver 10 as the center wavelength of the data pulses leaving the transceiver 10 already exhibit the chosen frequency bandwidth. However, as will be discussed below, the AOTF 94 serves a critical function in the case of a receiving transceiver 10a by allowing the user to selectively choose which of a plurality of communication networks that may be accessed by the transceiver, is to be heard from.

The output of the AOTF 94 is connected to the input of the transceiver's optical amplifier 70 (note: this is the same optical amplifier designated 20 in FIG. 1). As discussed previously, amplification of encoded data pulses leaving the transceiver is required due to the inherent loss of power resulting from transmission through optical fiber lines and the various coupler, modulators, etc. In addition, the fact that a low-energy harmonic was used as the locking wavelength of the ring laser 13, 13a in order to obtain the desired minimal pulse width and maximum pulse rate, results in a low-power pulse leaving the transceiver. The optical amplifier 70 used can be any of the commercially available erbium-doped fiber-optic amplifiers that are pumped with 980 nm wavelength light and enable amplification of optical pulses with wavelengths in the 1500–1600 nm range. The amplifier 70 is pumped with the same Argon ion pumped Ti:sapphire laser 23 used to pump the erbium-doped gain section 21 of the carrier source ring laser 13, 13a, as the Ti:sapphire laser 23 outputs optical radiation at the required 980 nm wavelength. The output of the optical amplifier 70 is connected to a standard communications optical fiber 71 (note: this is the same optical fiber designated 11 in FIG. 1). The optical fiber 71 is connected to a common optical coupler 12 for transmission to the network.

The common coupler 12 can be one of any commercially available passive bi-directional star type couplers. It need only have enough input/output pods 72 to accommodate all the potential users of the network. When a optical pulse enters the common coupler 12, exact copies of it, albeit of lower power, are transferred to all the other transceivers connected to the common coupler 12. If there are more than just a few users in the network, the weakened signal would not be strong enough to survive decoding and detection by the receiving transceiver 10a. However, the transceiver's optical amplifier 70a (note: this is the same optical amplifier designated 20a in FIG. 1) will amplify the weakened pulse so that it becomes usable. This is the same amplifier as used by a transmitting receiver to boost the power of an outgoing data pulse. These amplifiers 70, 70a are bi-directional and will amplify a pulse traveling in either direction (i.e. In or out of the transceiver).

The output of the receiving transceiver's optical amplifier 70a is connected to an AOTF 94a. This unit 94a is identical to all the other AOTF units 90, 94 used in this invention. The AOTF 94a allows a transceiver user, by input of a center wavelength select signal 92, to adjust the center wavelength so as to block all wavelengths but those associated with the selected center wavelength. The AOTF 94a, as described earlier, enables the user to communicate with various separate networks operating at different center wavelengths. The adjustment is stepped so that each selected center wavelength is separated in the frequency domain by more than the spectral bandwidth of the carrier pulse 17. This ensures the various networks envisioned by this invention operate at completely separate frequencies, so as to not interfere with each other if common optical fiber communications lines 71, 12 are shared between the networks. In the case of a receiving transceiver 10a, the AOTF 94a serves to block all data pulses not within the user selected bandwidth. This ensures only those data inputs from the particular network chosen by the user will be decoded and detected.

The output of the AOTF 92 is connected to the encoder/decoder section 15a of the receiving transceiver 10a via a standard communications fiber-optic line 69a and conventional alignment optics. It is the same encoder/decoder section as described in association with the encoding of data pulses, except in this case it is used for decoding of the data pulses the AOTF 92 allows into the transceiver. The received optical data pulse is diffracted by the second optical grating 65a identical to the one described above. The diffracted pulse then is collimated by the second collimating lens 67a described previously.

The diffracted, collimated pulse then enters the encoder/decoder element 68a. If the device 68a is coded with the conjugate of the transmitting transceiver's encoder/decoder element code, the phase delayed spectral components of the pulse are put back into phase with the unchanged components, so that the pulse returns to its original high intensity, short pulse width shape. The pulse is thereby "properly" decoded. If the encoder/decoder element 68a is not coded with the conjugate of the transmitting transceiver's encoder/decoder element 68, the spectral elements are not brought in phase with each other, and the pulse is "improperly" decoded, and remains a low intensity elongated noise-like burst. This is a function of the unique aspects of the M-sequence coding utilized for encoding the pulse as discussed previously.

The pulse, whether properly or improperly decoded, leaves the encoder/decoder element 68a and encounters the first collimating lens 66a. This lens 66a acts in reverse to the way it did during encoding. It "de-collimates" the decoded spectral components because the light is entering from the opposite direction. The "de-collimated" spectral components next impinge on the surface of the first grating 64a. Again, due to the angle at which the light hits the grating 64a, the spectral components are "re-diffracted" and returned to a mixed beam. The pulse is transferred to a standard communications fiber-optic line 63a via conventional alignment optics 77a well-known in the art. The fiber-optic line 63a is connected to the second port of the fiber-optic T-coupler 75a. The pulse is then routed by the T-coupler 75a to its third port, which is connected to a optical fiber 74a. The pulse then enters the detector apparatus 16a of the receiving transceiver 10b via the fiber 74a.

It should be noted that the above described optical paths within the encoder/decoder section 15, 15a are bi-directional, such that each transceiver can function as either a transmitter or receiver.

Before describing the detector apparatus, some specifics as to the sizing of the aforementioned optics (i.e. the optical gratings and lenses) is warranted. The size of the collimating lenses 66, 66a, 67, 67a is chosen such that at its focal length, the collimated spectral components of the optical data pulse obtain a focus that provides sufficient linear separation as to allow the encoder/decoder element 68, 68a to shift the phase of any one component without effect on the adjacent components. The so-determined size of the collimating lenses 66, 66a, 67, 67a then dictates the size of the gratings 64, 64a, 65, 65a. These gratings must be sized so that the spectral components leaving a grating's surface at their respective angles all impinge on a collimating lens somewhere within the circumference of the lens surface facing the grating. Therefore, as mentioned in the discussion of the optical carrier source, the size and distances separating the optics (i.e. the lenses, encoder/decoder, and gratings) from each other is dependent on the spectral bandwidth of the data pulse, and so dependent on its pulse width. The shorter the pulse width is, the broader the spectral bandwidth of the pulse becomes and the wider the linear physical separation of the spectral components become after diffraction and collimation. As the physical separation becomes wider, the collimating lens's focal length can be shorter, and so the optics can be smaller and closer together. In addition to the size of these gratings just discussed, the choice must also be made as to how many grating lines are to be on a grating. This number is a function of the number of coding elements, i.e. the total number of phase delayed and unphase delayed spectral components within the pulse. The tested embodiment employed gratings with 1200 lines/mm. This allowed coding of up to 63 spectral elements, thereby creating a 63-element code sequence.

The Detection Apparatus

The next step in implementing the optical protocol system of this invention is the creation of a device to detect and distinguish between a properly decoded or "un-encoded" optical data pulse and an improperly decoded pulse. This task is accomplished by the detection apparatus 16, 16a of the transceiver 10, 10a. The properly and improperly decoded data pulses are routed from a receiving transceiver's encoder/decoder section 15a to the detection apparatus 16a when the transceiver 10a is receiving data. "Un-encoded" data pulses are routed from a transmitting transceiver's data modulator 14 to the detection apparatus 16 when the transceiver is transmitting data, to provide a feedback to the user.

Referring to FIG. 5, the detection apparatus includes a pulse amplitude magnifier 80, a threshold device 82, and a detector 84. The input of the pulse amplitude magnifier 80 is coupled to the third port of the fiber-optic T-coupler 75 via an optical fiber 74 (or T-coupler 75a via fiber 74a in the case of a receiving transceiver 10a). The magnifier 80 enables the threshold device 82 to distinguish a properly decoded optical data pulse from the multitude of improperly decoded data pulses that may be superimposed thereon. The protocol system operates by transferring all transmitted data pulses to every other transceiver in the network. This means that any one transceiver will receive a relatively large number of data pulses not destined for that transceiver, in comparison to data pulses specifically encoded for that transceiver. Those data pulses not meant to be "read" by the receiving transceiver will be improperly decoded and remain in the low intensity noise burst state. However, the optical power contained in each such improperly decoded noise burst is additive. It is conceivable that several improperly decoded data pulses could reach the detector apparatus 16a, at the same time as a properly decoded pulse. This would be especially true if the entire network is synchronized so that each transmitting transceiver 10 was sending an encoded data pulse at the same time. The sum of the energy in the improperly decoded data pulses could easily overshadow the single properly decoded data pulse at the detector apparatus 16a in even a small network with just a few users. The solution to this problem is the pulse amplitude magnifier 80, which magnifies the amplitude (i.e. intensity) of the pulses sent through it. A properly decoded data pulse with its high peak power spike and shod pulse width becomes significantly larger than even the sum of a number of improperly decoded low intensity data pulses, because the pulse amplitude magnifier 80 increases the pulse amplitudes greatly.

The tested embodiment utilized a frequency doubler as the pulse amplitude magnifier 80. Frequency doubler devices are well known in the art, but are typically used to multiply the frequency of a light pulse. However, such a device also exhibits the phenomenon whereby the amplitude of an optical pulse is squared. This squaring of the already relatively high amplitude of a properly decoded pulse clearly distinguishes it from even the collective squares of the low amplitude improperly decoded pulses. Therefore, the threshold device 82 can be set to a sufficiently high detection threshold so that the collective noise pulses are ignored, whereas the properly decoded pulse is recognized. It should be noted that alternate intensity-enhancing devices could be used to perform the same function as the frequency doubler. Saturable absorbers and fiber-optic loop mirrors are two examples of such devices.

Upon transmission of a pulse from the data modulator 14, and prior to it being encoded, the un-encoded data pulses 19a are coupled via the T-coupler 75 for feedback purposes to the detector apparatus 16 in a transmitting transceiver 10. In this instance, the pulse amplitude multiplier 80 increases the amplitude of the pulses 19a above the level required by the threshold device 82.

The threshold device 82 is connected to and receives from the pulse amplitude magnifier 80, the amplitude enhanced pulse (or pulses) 90. The threshold device 82 operates by emitting a light pulse only when a selected amplitude threshold is exceeded. The threshold device 82 is therefore set above the level of any expected cumulative "noise" from improperly decoded data pulses. Accordingly, only the amplitude magnified, properly decoded pulses cause the threshold device 82 to emit. There are several intensity-dependent devices that can work as threshold devices. Among these are nonlinear Fabry-Perot etalons, nonlinear waveguides, and semiconductor injection lasers and amplifiers. Of particular interest are room temperature optically bistable GaInAs/AlInAs multiple-quantum-well etalons operating at the 1500–1600 nm wavelength of this invention. This later device can work passively if there is enough intensity in the pulse to switch the etalon, or actively if not. However, all these aforementioned devices exhibit relatively slow reaction times in the order of microseconds. This would limit the data rates at which this invention could operated. Fortunately, it is expected that progress in actively operated semiconductor laser/amplifier optical bistable devices will allow thresholding in the submicrosecond regime.

The final element of the detection apparatus 16, 16a is the detector 84. The detector 84 is connected to the threshold device 82, and detects light pulses emitted by the threshold device 82. Upon detection of the light pulse from the threshold device 82, the detector 84 transmits an electrical pulse. This output then exits the transceiver 10, 10a and is connected via signal path 85, 85a to the user's input device, thereby transmitting the received (or feedback) data to the user.

An ultra high-speed photodetector is used as the detector element 84. The preferred device is one using back-illuminated InGaAs Schottky diode technology. This type of photodetector uses standard optical fiber connections and can detect data at rates up to 60 GHz at the wavelength range of this invention.

Alternately, if the receiving user's input device requires optical pulses, a detector 84 could be chosen which would output an optical pulse when triggered by the threshold device 82.

Alternate Configurations

It should be noted that an option exists to operate each transceiver in the network of this invention synchronously by splitting the pulse from a "master" optical carrier source N way and thereafter individually amplifying each copy prior to supplying it to the data modulator of a transceiver in the network. This would have the advantages of ensuring all the transceivers in the network are operating at the same center wavelength and same pulse rate. In addition, only one optical carrier source laser need be constructed. An alternate way of accomplishing this same result would be to split the same electrical mode-locking pulse from a master system step-recovery diode (SRD) to synchronize all the carrier source lasers in the network.

Another concern exists in networks were significantly long runs of optical fiber is required to connect the users in the network. The spectral dispersion described previously can degrade the transmitted data pulses. However, in such networks, the degraded optical data pulses can be rectified by the use of a compensating device. For example, a dispersive optical processing stage consisting of prisms or optical grating pairs could be employed before sending the pulse to a receiving transceiver.

While the invention has been described in detail by specific reference to the tested and preferred embodiments thereof, it is understood that variations and modifications thereof may be made without departing from the true spirit and scope of the invention.

What is claimed is:

1. A fiber-optic communication network, comprising:

a fiber optic coupler having N fiber-optic ports;

N optical transceivers individually connected to corresponding ones of said N fiber-optic ports, each one of said N optical transceivers comprising means for transmitting to and receiving from said fiber optic coupler optical pulse signals in accordance with a predetermined code sequence of said one transceiver;

N optical amplifier means for amplifying the optical pulse signals conducted through corresponding ones of said N fiber-optic ports;

wherein each one of said optical transceivers further comprises detection apparatus for detecting a received optical pulse signal transmitted from another of said optical transceivers, said detector apparatus comprising means for magnifying the amplitude of said received optical pulse signal; and wherein each of said optical transceivers further comprises means for selecting an optical carrier center frequency at which said optical transceiver receives and transmits optical pulse signals within a predetermined frequency band in accordance with a user center frequency select signal whereby to permit communications on said network between different user pairs at different carrier center frequencies.

2. The network of claim 1 wherein said different carrier center frequencies are selectable from a set of non-overlapping carrier frequency bands.

3. A fiber-optic communication network, comprising:

a fiber optic coupler having N fiber-optic ports;

N optical transceivers individually connected to corresponding ones of said N fiber-optic ports, each one of said N optical transceivers comprising means for transmitting to and receiving from said fiber optic coupler optical pulse signals in accordance with a predetermined code sequence of said one transceiver;

N optical amplifier means for amplifying the optical pulse signals conducted through corresponding ones of said N fiber-optic ports; and wherein each of said N optical transceivers is controllable by a corresponding one of N remote user nodes, each one of said optical transceivers further comprising means for feeding back optical pulses transmitted by said one transceiver to the corresponding user node for confirmation thereof.

4. A fiber-optic communication network, comprising:

a fiber optic coupler having N fiber-optic ports;

N optical transceivers individually connected to corresponding ones of said N fiber-optic ports, each one of said N optical transceivers comprising means for transmitting to and receiving from said fiber optic coupler optical pulse signals in accordance with a predetermined code sequence of said one transceiver;

N optical amplifier means for amplifying the optical pulse signals conducted through corresponding ones of said N fiber-optic ports; and wherein each of said optical transceivers further comprises means for compensating for ordinary spectral phase dispersion of said optical pulse signals in said network.

5. A fiber-optic communication network, comprising:

a fiber optic coupler having N fiber-optic ports;

N optical transceivers individually connected to corresponding ones of said N fiber-optic ports, each one of said N optical transceivers comprising means for transmitting to and receiving from said fiber optic coupler optical pulse signals in accordance with a predetermined code sequence of said one transceiver;

N optical amplifier means for amplifying the optical pulse signals conducted through Corresponding ones of said N fiber-optic ports;

wherein each of said optical amplifier means comprises a fiber-optic amplifier characterized by a fiber optic gain frequency band;

wherein each one of said optical transceivers further comprises optical pulse carrier source means for producing a train of optical pulses characterized by a pulse width on the order of not substantially more than one picosecond and having a discrete optical spectrum and a carrier frequency within said fiber optic gain frequency band, wherein each of said optical pulses of said train of optical pulses comprises one of said optical pulse signals; and wherein said optical pulse carrier source further comprises means for compressing a pulse width of each one of said optical pulses.

6. The network of claim 5 wherein said means for compressing comprises a length of optical fiber in said carrier source and wherein said optical pulses have a sufficiently short pulse width and sufficiently high pulse amplitude so as to induce local disturbances in an index of refraction of said length of optical fiber whereby to produce a negative spectral phase dispersion on said optical pulses which compensates for ordinary spectral phase dispersion of said optical pulses in said carrier source in addition to compressing said pulse width of each of said optical pulses.

7. A fiber-optic communication network, comprising:

a fiber optic coupler having N fiber-optic ports;

N optical transceivers individually connected to corresponding ones of said N fiber-optic ports, each one of said N optical transceivers comprising means for transmitting to and receiving from said fiber optic coupler optical pulse signals in accordance with a predetermined code sequence of said one transceiver;

N optical amplifier means for amplifying the optical pulse signals conducted through corresponding ones of said N fiber-optic ports;

wherein each of said optical amplifier means comprises a fiber-optic amplifier characterized by a fiber optic gain frequency band;

wherein each one of said optical transceivers further comprises optical pulse carrier source means for producing a train of optical pulses characterized by a pulse width on the order of not substantially more than one picosecond and having a discrete optical spectrum and a carrier frequency within said fiber optic gain frequency band, wherein each of said optical pulses of said train of optical pulses comprises one of said optical pulse signals;

further comprising data modulator means for gating individual pulses of said train of optical pulses in accordance with an incoming stream of binary data characterized by a data rate, wherein said train of optical pulses is characterized by a repetition rate at least equal to said data rate; and wherein said optical carrier source comprises a laser actively mode-locked by an optical modulator driven by a pulse generator having a pulse repetition rate governing the repetition rate of said train of said optical pulses, said one optical transceiver further comprising means for coupling said pulse generator to said data modulator whereby to synchronize said data modulator with said optical pulses.

8. The network of claim 7 wherein said laser comprises a fiber-optic ring laser cavity including a doped optical fiber gain section and wherein said pulse repetition rate corresponds to a higher harmonic of said laser cavity.

9. A fiber-optic communication network, comprising:

a fiber optic coupler having N fiber-optic ports;

N optical transceivers individually connected to corresponding ones of said N fiber-optic ports, each one of said N optical transceivers comprising means for transmitting to and receiving from said fiber optic coupler optical pulse signals in accordance with a predetermined code sequence of said one transceiver;

N optical amplifier means for amplifying the optical pulse signals conducted through corresponding ones of said N fiber-optic ports;

wherein each one of said optical transceivers comprises means for spectrally phase encoding in accordance with said predetermined code sequence optical pulse signals to be transmitted to and decoding optical pulse signals received from the corresponding one of said N fiber-optic ports, and means for reconfiguring said code sequence in accordance with a user select signal; and wherein said means for spectrally phase encoding comprises means for reducing a peak amplitude of each of said optical pulse signals by a factor which is a function of N, whereby to enable distinction between a superposition of N-1 optical pulse signals received from other transceivers whose code sequences are not conjugates of the code sequence of said one transceiver.

10. The network of claim 9 wherein said means for spectrally phase encoding comprises means for phase delaying a predetermined fraction of the spectral components of said optical pulse signal in a spatial sequence corresponding to said code sequence.

11. A fiber-optic communication network, comprising:

a fiber optic coupler having N fiber-optic ports;

N optical transceivers individually connected to corresponding ones of said N fiber-optic ports, each one of said N optical transceivers Comprising means for transmitting to and receiving from said fiber optic coupler optical pulse signals in accordance with a predetermined code sequence of said one transceiver;

N optical amplifier means for amplifying the optical pulse signals conducted through corresponding ones of said N fiber-optic ports;

wherein each one of said optical transceivers comprises means for spectrally phase encoding in accordance with said predetermined code sequence optical pulse signals to be transmitted to and decoding optical pulse signals received from the corresponding one of said N fiber-optic ports, and means for reconfiguring said code sequence in accordance with a user select signal; and wherein said optical pulse signal has a discrete spectrum and wherein said means for spectrally phase encoding/decoding comprises means for spatially dispersing spectral components of said optical pulse signal in a spectral order in a Fourier plane and reconfigurable phase modulator means located at said Fourier plane for phase-delaying selected ones of said spectral components in accordance with said code sequence, said phase modulator means having a spatial resolution and wherein said optical pulse signal has a sufficiently narrow pulse width whereby to permit said means for spatially dispersing to disperse said spectral components to a spatial resolution between said spectral components corresponding to said spatial resolution of said phase modulator means.

12. The network of claim 11 wherein said phase modulator means comprises one of: (a) an electronically reconfigurable spatial light modulator and (b) a mechanically shiftable phase plate.

13. A fiber-optic communication network, comprising:

a fiber optic coupler having N fiber-optic ports;

N optical transceivers individually connected to corresponding ones of said N fiber-optic ports, each one of said N optical transceivers comprising means for transmitting to and receiving from said fiber optic coupler optical pulse signals in accordance with a predetermined code sequence of said one transceiver;

N optical amplifier means for amplifying the optical pulse signals conducted through corresponding ones of said N fiber-optic ports;

wherein each one of said optical transceivers further comprises detection apparatus for detecting a received optical pulse signal transmitted from another of said optical transceivers, said detector apparatus comprising means for magnifying the amplitude of said received optical pulse signal; and wherein said means for magnifying comprises one of: (a) a frequency doubler, (b) a saturable absorber, (c) a fiber optic loop mirror.

14. A fiber-optic communication network, comprising:

a fiber optic coupler having N fiber-optic ports;

N optical transceivers individually connected to corresponding ones of said N fiber-optic ports, each one of said N optical transceivers comprising means for transmitting to and receiving from said fiber optic coupler optical pulse signals in accordance with a predetermined code sequence of said one transceiver;

N optical amplifier means for amplifying the optical pulse signals conducted through corresponding ones of said N fiber-optic ports; and self-aligning fiber-optic connectors connecting each of said optical amplifiers between corresponding ports of said fiber optic coupler and corresponding ones of said optical transceivers.

* * * * *